United States Patent
Ikegami

(10) Patent No.: US 12,372,984 B2
(45) Date of Patent: Jul. 29, 2025

(54) FLOW RATE CONTROL DEVICE, FLOW RATE CONTROL METHOD, AND CHILLER

(71) Applicant: SHINWA CONTROLS CO., LTD, Kawasaki (JP)

(72) Inventor: Toru Ikegami, Kawasaki (JP)

(73) Assignee: Shinwa Controls Co., Ltd., Kawasaki (JP)

( * ) Notice: Subject to any disclaimer, the term of this patent is extended or adjusted under 35 U.S.C. 154(b) by 290 days.

(21) Appl. No.: 18/000,300

(22) PCT Filed: Jun. 16, 2021

(86) PCT No.: PCT/JP2021/022786
§ 371 (c)(1),
(2) Date: Nov. 30, 2022

(87) PCT Pub. No.: WO2021/256481
PCT Pub. Date: Dec. 23, 2021

(65) Prior Publication Data
US 2023/0221735 A1    Jul. 13, 2023

(30) Foreign Application Priority Data

Jun. 16, 2020 (JP) ................................. 2020-103903

(51) Int. Cl.
*G05D 7/06* (2006.01)
*F25B 41/40* (2021.01)

(52) U.S. Cl.
CPC ........... *G05D 7/0623* (2013.01); *F25B 41/40* (2021.01); *F25B 2600/13* (2013.01); *F25B 2700/13* (2013.01)

(58) Field of Classification Search
CPC ...... G05D 7/0623; G05D 7/0676; G05D 7/00; G05D 7/06; F25B 41/40; F25B 2600/13; F25B 2700/13; F04B 49/06; H02P 6/08
See application file for complete search history.

(56) References Cited

U.S. PATENT DOCUMENTS

| | | | |
|---|---|---|---|
| 6,350,105 B1 * | 2/2002 | Kobayashi | F04D 15/0066 417/44.1 |
| 9,587,640 B2 * | 3/2017 | Ahonen | F04D 15/0088 |
| 2016/0222950 A1 | 8/2016 | Kawamori et al. | |

FOREIGN PATENT DOCUMENTS

| | | |
|---|---|---|
| JP | H04-284191 A | 10/1992 |
| JP | 4569324 B2 | 10/2010 |

(Continued)

OTHER PUBLICATIONS

International Search Report and Written Opinion (Application No. PCT/JP2021/022786) dated Aug. 31, 2021.

(Continued)

*Primary Examiner* — Christopher W Carter
(74) *Attorney, Agent, or Firm* — BURR PATENT LAW, PLLC

(57) ABSTRACT

A flow rate control device according to one embodiment includes: a flowmeter that repeatedly generates a pulse signal based on flow of a fluid discharged from a fluid machine driven by a brushless motor or AC motor, such that a pulse width of the pulse signal is inversely proportional to a flow rate of the fluid; an FV converter that makes frequency-voltage conversion of the pulse signal and generates a voltage value corresponding to the pulse signal; and a controller that changes a frequency of a drive input voltage for driving the brushless motor or AC motor based on a difference between a converted flow rate of the fluid converted based on the voltage value generated by the FV converter and a preset target flow rate.

12 Claims, 5 Drawing Sheets

(56) References Cited

FOREIGN PATENT DOCUMENTS

| | | |
|---|---|---|
| JP | 2015-184750 A | 10/2015 |
| JP | 2016-142216 A | 8/2016 |

OTHER PUBLICATIONS

English translation of the International Preliminary Report on Patentability (Chapter I) dated Dec. 29, 2022 (Application No. PCT/JP2021/022786).

* cited by examiner

| DIFFERENCE BETWEEN CONVERTED FLOW RATE AND TARGET FLOW RATE $\Delta d$ (L/min) | TUNING FREQUENCY $\Delta f$ (Hz) |
|---|---|
| $D1 \leqq \Delta d < D2$ | $\Delta f1$ |
| $D2 \leqq \Delta d < D3$ | $\Delta f2$ |
| $D3 \leqq \Delta d < D4$ | $\Delta f3$ |
| $D4 \leqq \Delta d < D5$ | $\Delta f4$ |
| ⋮ | ⋮ |

FLOW RATE CONTROL DEVICE, FLOW RATE CONTROL METHOD, AND CHILLER

FIELD OF THE INVENTION

The present invention relates to a flow rate control device and a flow rate control method for controlling a flow rate of a fluid discharged from a fluid machine such as a pump, a blower, etc., and to a chiller comprising the flow rate control device.

BACKGROUND ART

A flow rate control device comprising a flowmeter that measures a flow rate of liquid discharged from a pump, and a controller that controls operation of the pump based on a difference between the flow rate measured by the flowmeter and a target flow rate has been conventionally known. (JP 4569324B)

Such a flow rate control device may use an impeller-type flowmeter for its flowmeter. The impeller-type flowmeter repeatedly generates a pulse signal based on a liquid flow. The higher a flow rate of the liquid, the smaller a pulse width of a generated signal. Namely, a period of a signal decreases while its frequency increases. Thus, the impeller-type flowmeter generates more pulse signals within a certain time frame as a flow rate of liquid to be measured increases.

When the above controller uses a CPU, the CPU determines a current flow rate by acquiring a potential level of a pulse input wave made of a pulse signal repeatedly generated from the impeller-type flowmeter at a predetermined sampling period, and by finding out whether the potential level of the pulse signal is at a high or low level. Namely, a pulse width of a pulse signal can be determined by using a time interval between low current level detection points that have an area where a current level is continuously high inbetween, and a current flow rate can also be determined accordingly. In this case, the smaller a pulse width is, the higher a flow rate is.

SUMMARY OF THE INVENTION

The present inventors have so far applied a flow rate control device whose CPU samples pulse signals from an impeller-type flowmeter to many systems. However, flow rate control may, although rare, become unstable in such a system.

The present inventors have conducted extensive studies and found that the aforementioned unstableness is caused by detection leakage of a pulse signal. While a common CPU (so-called "single core") performs a certain process, the CPU stops other processes. Thus, while the CPU performs a process other than a sampling process for pulse signals, it basically stops the sampling process for pulse signals. In order for the CPU to identify a pulse width, the CPU needs to continuously perform a sampling process over pulse widths. However, there is a possibility that a sampling process cannot be quickly performed as needed, because another process is performed. In addition, a sampling process may not be appropriately performed when a sampling process is interrupted by another process. In these cases, detection leakage may occur.

The above detection leakage can be solved by using a CPU having an excellent processing capacity, by using a plurality of CPUs, or by using a dual core CPU. However, these solutions may invite high cost and complicatedty of hardware resources. Using plural CPUs and a dual-core CPU may complicate a software process.

In flow rate control, PID control is generally used. However, a processing load on a CPU increases when a CPU performs PID control, which may lower responsiveness. The use of a CPU having high processing capacity may provide good responsiveness. However, it needs a high cost of hardware resources. In addition, it is not easy to create a software for a CPU to perform PID control. Although PID controllers that can be used in various fields are available in the market, this solution also results in high cost of hardware resources, and also increases a device footprint. In order to improve the degree of freedom to perform an operation with high processing load, such as the above PID control, it is desired to simplify a process different from PID control, such as a sampling process, and avoid high cost and complicatedty of hardware resources.

The present invention has been made in view of the aforementioned circumstances. The object of the present invention is to provide a flow rate control device, a flow rate control method, and a chiller that are capable of performing suitable flow rate control by means of simple hardware resources and software processes.

A flow rate control device according to one embodiment of the present invention is a flow rate control device comprising: a flowmeter that repeatedly generates a pulse signal based on flow of a fluid discharged from a fluid machine driven by a brushless motor or AC motor, such that a pulse width of the pulse signal is inversely proportional to a flow rate of the fluid; an FV converter that makes frequency-voltage conversion of the pulse signal and generates a voltage value corresponding to the pulse signal; and a controller that changes a frequency of a drive input voltage for driving the brushless motor or AC motor based on a difference between a converted flow rate of the fluid converted based on the voltage value generated by the FV converter and a preset target flow rate.

Since the FV converter makes frequency-voltage conversion of the pulse signal generated by the flowmeter, the flow rate control device according to the present invention can convert pulse signals repeatedly generated by the flowmeter into a continuous physical quantity of voltage values (analog signals). Thus, for example, the controller can determine a voltage value showing a flow rate by one sampling carried out at a given timing, and can decide a flow rate of the fluid to be discharged from the fluid machine. This enables to suppress detection leakage of the controller with a reduced load of a signal process, and to appropriately perform flow rate control based on the flow rate detection. Thus, the flow rate control can be suitably performed by simple hardware resources and software processes.

The FV converter may be configured to generate the one voltage value for the one pulse signal, and to calculate a reference voltage value by a moving average of a plurality of the voltage values, and the controller may convert the converted flow rate from the reference voltage value.

In this case, even if the voltage values generated by the FV converter may include an unreliable value, since information sampled by the controller is a reference voltage value calculated from a moving average of a plurality of voltage values, reliability of the information for determining a flow rate can improved, and reliability of the flow rate to be decided can be improved.

The FV converter may calculate the reference voltage value by a moving average of the voltage values the number of which is between 40 or more and 80 or less.

The FV converter may make frequency-voltage conversion of the pulse signals generated by the flowmeter at a rate of between 10 or more and 120 or less per second.

This can effectively improve reliability of the reference voltage value which is information sampled by the controller.

The controller may store a tuning frequency table that records relationships between a plurality of difference ranges each of which defines a range to which an absolute value of a difference between the converted flow rate and the target flow rate belongs by a lower limit value and an upper limit value of the range, and a plurality of tuning frequencies defined correspondingly to the respective difference ranges; and the controller may decide, based on a difference between the converted flow rate and the target flow rate and the tuning frequency table, the tuning frequency corresponding to the difference between the converted flow rate and the target flow rate, from among the plurality of tuning frequencies, and changes a frequency of the drive input voltage by outputting a command for adding or subtracting the decided tuning frequency to or from a frequency of the drive input voltage at a time of the decision of the tuning frequency.

This makes it possible to control the brushless motor or AC motor such that a flow rate of the fluid comes close to the target flow rate by using the tuning frequency table having a simple structure. Since the flow rate control can be performed without complicated logic operations, hardware resources and software processes can be effectively simplified.

The controller may first perform a former-stage tuning operation that adds or subtracts once the tuning frequency ($\Delta f$), thereafter when a sign of a difference between a flow rate of the fluid and the target flow rate is not reversed to a sign of a difference at a time of decision of frequency, which is a difference between the converted flow rate and the target flow rate at a time of the decision of the tuning frequency ($\Delta f$), or when there still remains a difference, the former-stage tuning operation further adds or subtracts, once or more than once, the tuning frequency ($\Delta f$) until the sign of the difference between a flow rate of the fluid and the target flow rate is reversed to the sign of the difference at a time of decision of frequency, which is the difference at a time of the decision of the tuning frequency ($\Delta f$), or until there is no difference, when there still remains a difference between a flow rate of the fluid and the target flow rate after the former-stage tuning operation, the controller may perform a latter-stage tuning operation by n times a fine tuning unit process that adds or subtracts, once or more than once, a fine tuning frequency ($\Delta fn$), which is smaller than the tuning frequency ($\Delta f$) used in the former-stage tuning operation, to or from the drive input voltage, until a flow rate of the fluid and the target flow rate match each other.

Thereafter, when the fine tuning unit processes are performed more than once (n≥2), the controller may set the fine tuning frequency ($\Delta fn$) used in the fine tuning unit process such that the fine tuning frequency ($\Delta fn$) is smaller than the fine tuning frequency ($\Delta fn$) used in the immediately before fine tuning unit process.

Herein, on the assumption that the former-stage tuning process is defined as the $0^{th}$ fine tuning unit process, when a flow rate of the fluid calculated after the $(n-1)^{th}$ fine tuning unit process exceeds the target flow rate, the $n^{th}$ fine tuning unit process in the latter-stage tuning operation may subtract, once or more than once, the fine tuning frequency ($\Delta fn$) from a frequency of the drive input voltage after the $(n-1)^{th}$ fine tuning unit process, until the sign of the difference between a flow rate of the fluid and the target flow rate turns to minus, or until there is no difference between a flow rate of the fluid and the target flow rate, when a flow rate of the fluid calculated after the $(n-1)^{th}$ fine tuning unit process falls below the target flow rate, the $n^{th}$ fine tuning unit process in the latter-stage tuning operation may add, once or more than once, the fine tuning frequency ($\Delta fn$) to a frequency of the drive input voltage after the (n-1)th fine tuning unit process, until the sign of the difference between a flow rate of the fluid and the target flow rate turns to plus, or until there is no difference between a flow rate of the fluid and the target flow rate, and when there still remains a difference between a flow rate of the fluid and the target flow rate after the $n^{th}$ fine tuning unit process, the controller may perform the next fine tuning unit process in the latter-stage tuning operation.

The fine tuning frequency ($\Delta fn$) used in the $n^{th}$ fine tuning unit process may be set to be a value obtained by dividing the tuning frequency ($\Delta f$) used in the former-stage tuning operation by $n^{th}$ power of 2.

This makes it possible to control the brushless motor or AC motor such that a flow rate of the fluid gradually comes close to the target flow rate without complicated logic operations. In more detail, when the fine tuning unit process is performed a plurality of times, the fine tuning frequency ($\Delta fn$) used in the fine tuning unit process is obtained such that it is smaller than that of the immediately before fine tuning frequency in accordance with a simple predetermined rule. This can effectively suppress a load on the calculation of the operation amount for making a flow rate of the fluid gradually come close to the target flow rate.

In particular, when the fine tuning frequency used in the $n^{th}$ fine tuning unit process is set to be a value obtained by dividing the firstly decided tuning frequency by $n^{th}$ power of 2, a load on the calculation of the operation amount for making a flow rate of the fluid gradually come close to the target flow rate can be effectively suppressed. Further, reduction in responsiveness to the target flow rate and load on the fluid machine, which may be caused when a flow rate varies largely, can be suppressed.

The tuning frequency ($\Delta f$) may be set such that an absolute value of a flow rate change amount of the fluid that is increased or decreased by adding or subtracting the tuning frequency ($\Delta f$) to or from a frequency of the drive input voltage is smaller than the lower limit value of the difference range corresponding to the tuning frequency ($\Delta f$).

This can suppress reduction in responsiveness to the target flow rate, which may be caused when a flow rate varies largely.

The upper limit value may be set to be smaller than a value twice the lower limit value, and the tuning frequency ($\Delta f$) may be set such that an absolute value of a flow rate change amount of the fluid that is increased or decreased by adding or subtracting the tuning frequency ($\Delta f$) to or from a frequency of the drive input voltage is larger than a half of the upper limit value of the difference range corresponding to the tuning frequency ($\Delta f$).

This can suppress reduction in responsiveness to the target flow rate, which may be caused when the flow rate tuning is performed at excessively small steps.

The controller may perform, by a single-core CPU, a process for acquiring the voltage value, a process for converting a flow rate of the fluid based on the voltage value, a process for calculating a difference between the converted flow rate and the target flow rate, and a process for changing a frequency of the drive input voltage.

This enables suitable flow rate control by simple hardware resources, while avoiding a high cost.

In addition, a flow rate control method according to one embodiment of the present invention is a flow rate control method comprising: a pulse signal acquisition step that acquires a pulse signal from a flowmeter that repeatedly generates the pulse signal based on flow of a fluid discharged from a fluid machine driven by a brushless motor or AC motor, such that a pulse width of the pulse signal is inversely proportional to a flow rate of the fluid; an FV conversion step that makes frequency-voltage conversion of the pulse signal and generates a voltage value corresponding to the pulse signal; and a control step that changes a frequency of a drive input voltage for driving the brushless motor or AC motor based on a difference between a converted flow rate of the fluid converted based on the voltage value generated by the FV conversion step and a preset target flow rate.

In addition, a chiller according to one embodiment of the present invention is a chiller comprising the aforementioned flow rate control device, and a liquid circulator that circulates a cooled liquid, wherein a flow rate of the liquid is controlled by the flow rate control device.

The present invention can suitably perform flow rate control by simple hardware resources and software processes.

DETAILED DESCRIPTION OF THE INVENTION

Figure 1:
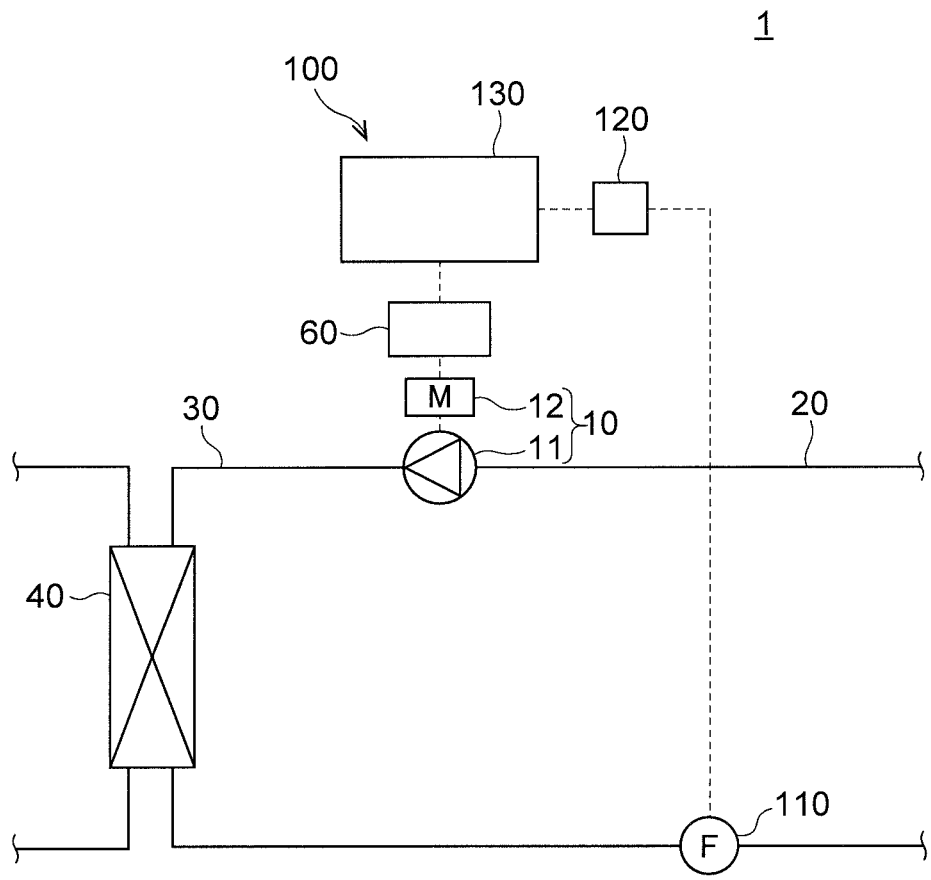
FIG. 1 is a view showing a schematic structure of a chiller comprising a flow rate control device according to an embodiment of the present invention.

A chiller 1 comprising a flow rate control device 100 according to an embodiment of the present invention is described hereunder. FIG. 1 is a view showing a schematic structure of the chiller 1.

As shown in FIG. 1, the chiller 1 comprises a pump 10, an upstream flow channel 20 connected to a suction port of the pump 10, a downstream flow channel 30 connected to a discharge port of the pump 10, and a flow rate control device 100.

The pump 10 has a pump body 11 having an impeller accommodated in a casing, and a motor 12 for rotating the impeller.

The chiller 1 operates the motor 12 to rotate the impeller of the pump body 11, so that a liquid sucked into the pump 10 from the upstream flow channel 20 is discharged to the downstream flow channel 30. The liquid having flown into the downstream flow channel 30 is cooled by a heat exchanger 40, and is then supplied from an outlet of the downstream flow channel 30 to a temperature control target, not shown.

In this embodiment, after the liquid supplied to the temperature control target from the outlet of the downstream flow channel 30 has passed through the temperature control target, the liquid flows into the upstream flow channel 20 and is then sucked into the pump 10 again. Namely, the chiller 1 is configured to circulate the liquid.

Note that the chiller 1 is not limited to the above circulation type, and may be configured as a so-called discharge type. The chiller of a discharge type is configured such that it sequentially sucks a liquid to be supplied to a temperature control target from a liquid source, and does not circulate the liquid having been supplied to the temperature control target to the liquid source.

The chiller 1 in this embodiment uses brine as a liquid to be circulated, but the liquid is not particularly limited.

The motor 12 is electrically connected to a drive circuit 60, and is driven by a drive input voltage supplied from the drive circuit 60 as power. The motor 12 in this embodiment, which is a brushless DC motor, increases a rotational speed proportional to a frequency of the drive input voltage supplied from the drive circuit 60. In detail, the motor 12 in this embodiment is a three-phase brushless DC motor, but the number of phases of the motor 12 is not particularly limited.

The drive circuit 60 has a function of changing a frequency of the drive input voltage in response to a command from the flow rate control device 100. The flow rate control device 100 can control a flow rate of a liquid to be discharged from the pump 10 by changing a frequency of the drive input voltage to regulate a rotational speed of the motor 12. The motor 12 may be an AC motor. Also in this case, a rotational speed increases proportional to a frequency of a supplied drive input voltage. When the motor 12 is an AC motor, the drive circuit 60 is configured as an inverter.

Figure 2:
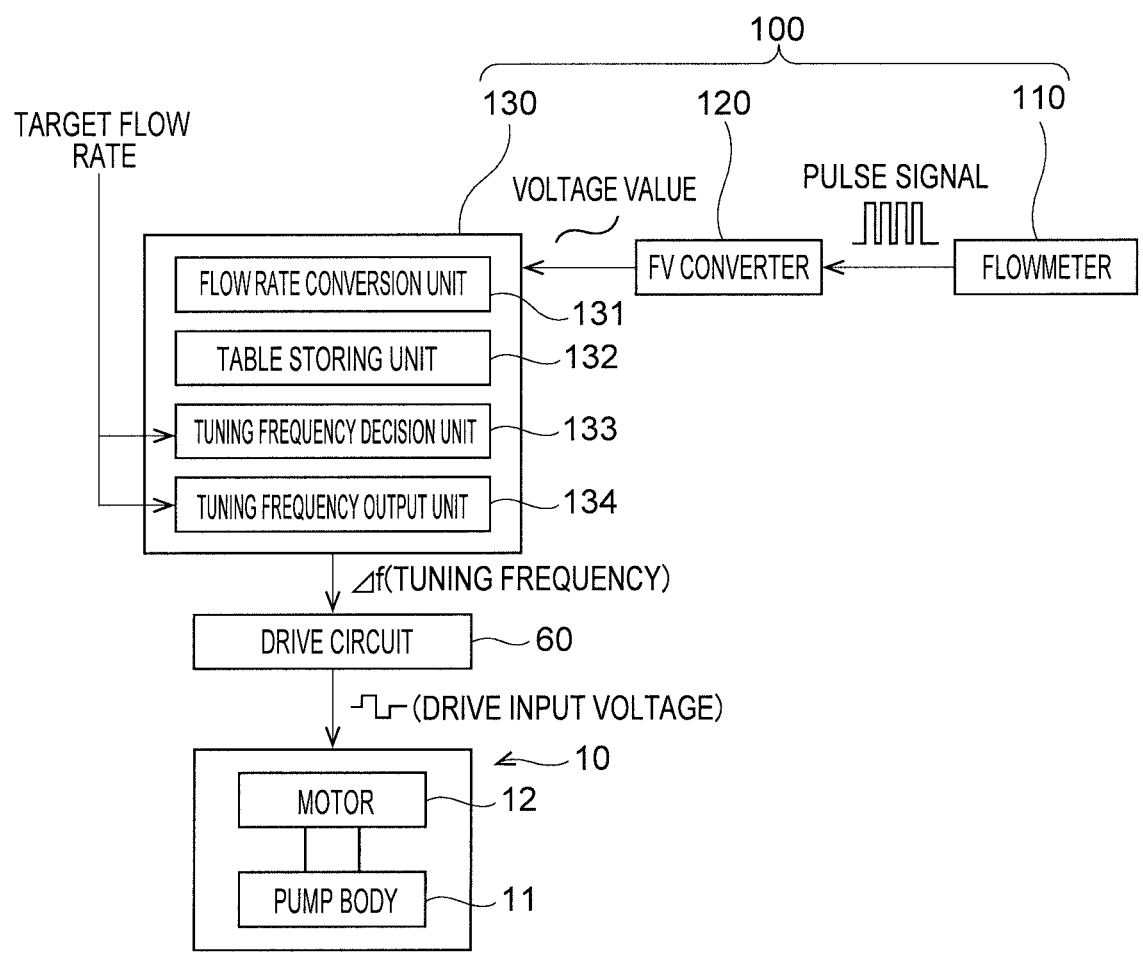
FIG. 2 is a block diagram showing functional structures of the flow rate control device according to the embodiment of the present invention.

The flow rate control device 100 has a flowmeter 110 provided on the downstream flow channel 30, an FV converter 120 electrically connected to the flowmeter 110, and a controller 130 electrically connected to the FV converter 120 and the drive circuit 60. FIG. 2 is a block diagram showing functional structures of the flow rate control device 100. Details of the respective units of the flow rate control device 100 are described below, with reference to FIGS. 1 and 2.

The flowmeter 110 repeatedly generates a pulse signal based on flow of a liquid discharged from the pump 10, such that a pulse width of a generated pulse signal is inversely proportional to a flow rate of the liquid. As a flow rate of the liquid increases, a pulse width and a period of a pulse signal generated by the flowmeter 110 decrease, while a frequency thereof increases.

The illustrated flowmeter 110 is formed of an impeller type flowmeter, but it may be a paddle type flowmeter, etc. FIG. 1 shows that the flowmeter 110 is provided between the outlet of the downstream flow channel 30 and the heat exchanger 40, but an installation position of the flowmeter 110 is not particularly limited.

The FV converter 120 makes frequency-voltage conversion (FV conversion hereunder) of a pulse signal generated by the flowmeter 110, and generates a voltage value corresponding to the pulse signal generated by the flowmeter 110. In detail, the FV converter 120 is configured to convert pulse signals repeatedly generated by the flowmeter 110 into a continuous physical quantity of voltage values (analog signals).

The FV converter 120 generates one voltage value for one pulse signal. A voltage value generated by the FV converter 120 increases proportional to a frequency of a pulse signal generated by the flowmeter 110.

The FV converter 120 is configured to calculate a reference voltage value based on a moving average of a plurality of generated voltage values. The reference voltage value is preferably calculated based on a moving average of voltage values the number of which is between 40 or more and 80 or less. More specifically, the reference voltage value is preferably calculated based on a moving average of voltage values the number of which is between 40 or more and 80 or less, which are generated in a cycle between 1 second or more and 4 second or less. In this case, the FV converter 120 preferably makes FV conversion of pulse signals generated by the flowmeter 110 at a rate of between 10 or more and 120 or less per second, for example. In order to realize the FV conversion at such a rate, the flowmeter 110 should have a specification that allows the flowmeter 110 to output pulse signals at a frequency between 10 Hz and 120 Hz based on a flow rate of the liquid.

Various structures of the FV converter 120 have been conventionally proposed. The FV converter 120 in this embodiment does not need to have a function such as sinusoidal FV conversion, etc., because it acquires only rectangular pulses from the flowmeter 110. Thus, the FV converter 120 is preferably relatively small and capable of performing the minimum FV conversion. In particular, the FV converter 120 is preferably composed of a monolithic IC. The use of such a relatively small FV converter may be advantageous in terms of footprint.

Figure 3:
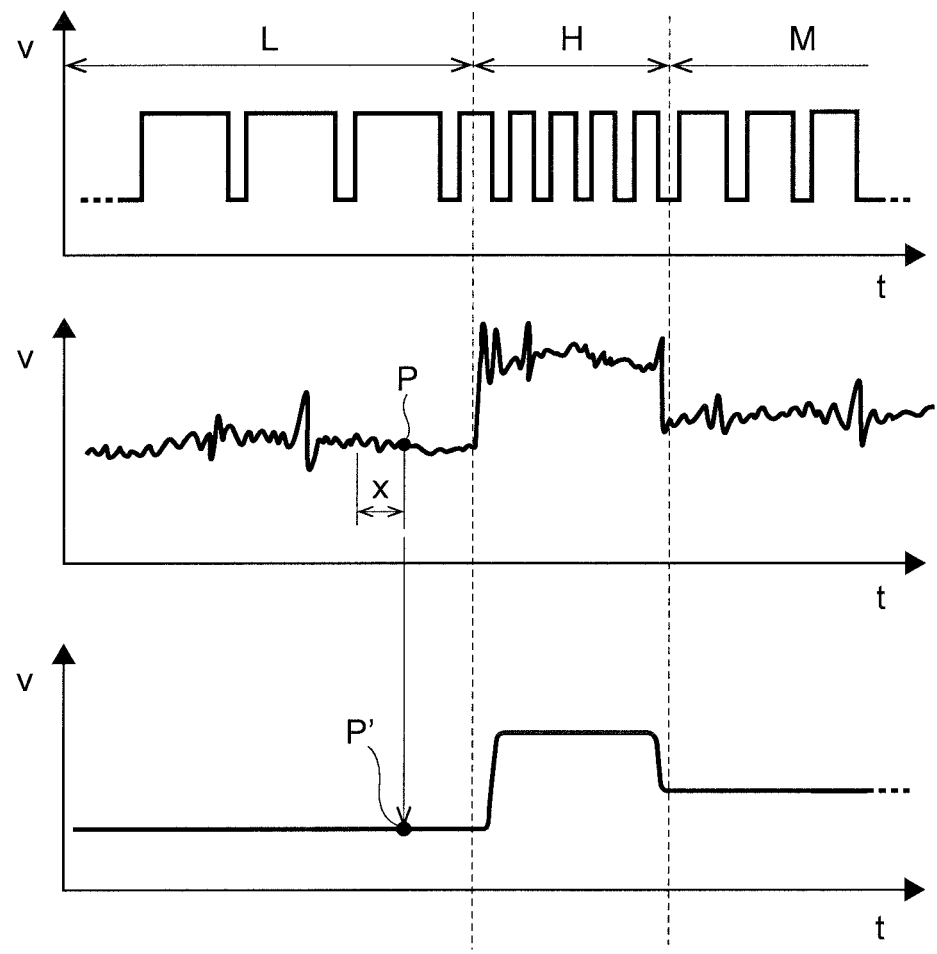
FIG. 3 is a view illustrating a pulse signal generated by a flowmeter of the flow rate control device according to the embodiment of the present invention, and frequency-voltage conversion made by an FV converter of the flow rate control device.

FIG. 3 is a view illustrating pulse signals generated by the flowmeter 110, and the frequency-voltage conversion made by the FV converter 120. FIG. 3 shows vertically arranged three graphs, with the horizontal (abscissa) axis of each graph indicating time (t) and the vertical (ordinate) axis thereof indicating voltage (V), respectively. The top graph shows pulse signals generated by the flowmeter 110 in accordance with the course of the liquid flow, the middle graph shows voltage values generated by the FV converter 120 that makes FV conversion of the pulse signals generated by the flowmeter 110, and the bottom graph shows reference voltage values calculated by a moving average of a plurality of the voltage values generated by the FV converter 120.

In the top graph of FIG. 3, a range indicated by L shows a range in which a flow rate of the liquid is relatively small, a range indicated by H shows a range in which a flow rate of the liquid is larger than the flow rate of the liquid in the range L, and a range indicated by M shows a range in which a flow rate of the liquid is larger than the flow rate of the liquid in the range L but is smaller than the flow rate of the liquid in the range H.

As is clear from the top graph of FIG. 3, a pulse width (period) of the pulse signals generated in the range H is smaller than pulse widths (periods) of the pulse signals generated in the ranges L and M. The pulse width (period) of the pulse signals generated in the range M is smaller than the pulse width (period) of the pulse signals generated in the range L. Note that the number of pulse signals shown in the respective ranges L, H and M in the top graph of FIG. 3 is smaller than actual ones, for the sake of simplification.

The middle graph of FIG. 3 shows voltage values obtained by FV converter 120 that makes FV conversion of the pulse signals in the respective ranges L, H and M. The voltage values corresponding to the pulse signals shown in the range H are larger than the voltage values corresponding to the pulse signals of the other ranges L and M. The voltage values corresponding to the pulse signals in the range M are larger than the voltage values corresponding to the pulse signals in the range L.

In the middle graph of FIG. 3, a series of voltage values corresponding to the pulse signals of the respective ranges L, H and M include a voltage value which is likely to be a noise component. Thus, the FV converter 120 in this embodiment calculates reference voltages by a moving average.

The bottom graph of FIG. 3 shows reference voltage values calculated by the FV converter 120 based on a moving average. The reference voltage values in this graph transit smoothly, and generation of a voltage value which is likely to be a noise component is suppressed.

By way of example, the FV converter 120 may calculate a reference voltage value from a moving average of the latest voltage value and some voltage values detected before the latest voltage value. Specifically, when a reference voltage value is calculated at a point P in the middle graph of FIG. 3, a reference voltage value at a point P' in the bottom graph of FIG. 3 may be calculated from a moving average of a voltage value at the point P and some voltage values detected during a time period x prior to the point P. The controller 130 in this embodiment samples a reference voltage value, converts a flow rate of the liquid based on the reference voltage value, and then controls the flow rate. Namely, this embodiment can improve stability in flow rate control because a situation in which the controller 130 samples a noise component of a voltage value and controls a flow rate based on the noise component can be avoided.

Next, the controller 130 is described. The controller 130 changes a frequency of a drive input voltage for driving the motor 12, based on a difference between a flow rate of the liquid converted based on a voltage value generated by the FV converter 120, and a preset target flow rate.

The controller 130 may be formed of a computer having a CPU, a ROM, etc. In this case, the controller 130 performs, based on a program stored in the ROM, various processes such as a process for acquiring a voltage value, a process for converting a flow rate of the liquid based on the voltage value, a process for calculating a difference between the converted flow rate and the target flow rate, and a process for changing a frequency of the drive input voltage based on the difference. In particular, as will become clear in the following description, since this embodiment makes simple these various processes, even a single-core CPU can perform suitable control. The use of a single-core CPU makes it easy to simplify hardware resources. Note that the type of CPU is not particularly limited. In addition, the controller may be formed of another processor or electric circuit (e.g., FPGA (Field Programmable Gate Array)).

As shown in FIG. 2, the controller 130 has, as the functional structures, a flow rate conversion unit 131, a table storing unit 132, a tuning frequency decision unit 133, and a tuning frequency output unit 134.

The flow rate conversion unit 131 samples a voltage value generated by the FV converter 120, i.e., a reference voltage value in this embodiment, and converts a converted flow rate, i.e., a current flow rate of the liquid from the reference voltage value. The larger a reference voltage value is, the larger a converted flow rate converted by the flow rate conversion unit 131 is.

The table holding unit 132 stores a tuning frequency table Ta that records relationships between a plurality of difference ranges and a plurality of tuning frequencies defined correspondingly to the respective difference ranges. Each of the difference ranges defines a range to which an absolute value of a converted flow rate converted by the flow rate conversion unit 131 and a target flow rate belongs by a lower limit value and an upper limit value of the range. Namely, the tuning frequency table Ta is a table that records relationships between a plurality of difference ranges for classifying difference degrees between the converted flow rate converted by the flow rate conversion unit 131 and the target flow rate at a plurality of stages, and a plurality of tuning frequencies defined correspondingly to the respective difference ranges. Lower limit values and upper limit values of the plurality of difference ranges differ from one another.

The target flow rate to be compared with the converted flow rate converted by the flow rate conversion unit 131 is inputted by a user to the controller 130. In this embodiment, the inputted target flow rate is transmitted to the tuning frequency decision unit 133 and the tuning frequency output unit 134, and is stored by the respective the tuning frequency decision unit 133 and the tuning frequency output unit 134.

The tuning frequency decision unit 133 calculates a difference between the converted flow rate converted by the flow rate conversion unit 131 and the target flow rate, and decides, based on the difference and the tuning frequency table Ta stored by the table holding unit 132, a tuning frequency corresponding to the calculated difference, from among the plurality of tuning frequencies recorded in the tuning frequency table Ta.

The tuning frequency decided by the tuning frequency decision unit 133 is transmitted to the tuning frequency output unit 134. The tuning frequency output unit 134 outputs, to the drive circuit 60, a command for adding or subtracting the tuning frequency transmitted from the tuning frequency decision unit 133 to or from a frequency of the drive input voltage at a time of the decision of the tuning frequency. Thus, a frequency of the drive input voltage which is inputted by the drive circuit 60 to the motor 12 is changed.

Figures 4, 5:
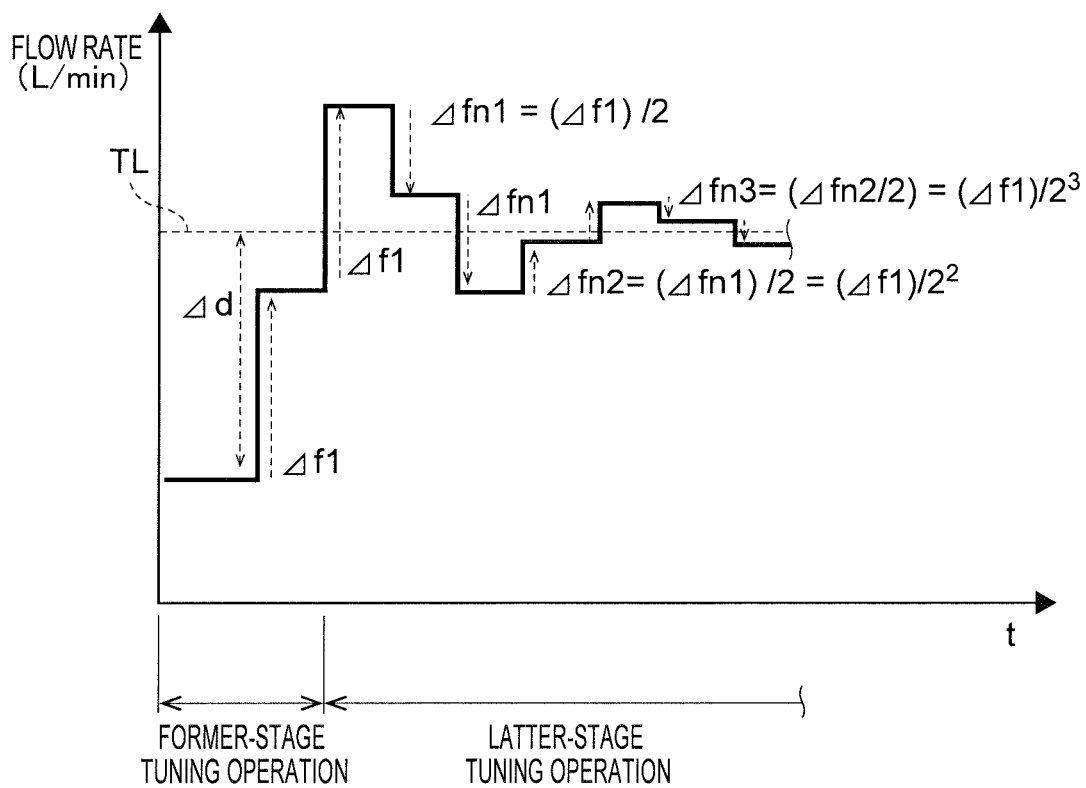
FIG. 4 is a view conceptually showing an example of a tuning frequency table stored in a controller of the flow rate control device according to the embodiment of the present invention.
FIG. 5 is a view showing a graph illustrating how a flow rate changes when flow rate control is performed by the flow rate control device according to the embodiment of the present invention.

FIG. 4 is a view conceptually showing the tuning frequency table Ta stored by the table holding unit 132. FIG. 4 shows some of the relationships between the difference ranges and the tuning frequencies. Specifically, FIG. 4 shows a relationship between a difference range defined by a lower limit value D1 and an upper limit value D2, and a tuning frequency Δf1 corresponding thereto, a relationship between a difference range defined by a lower limit value D2 and an upper limit value D3, and a tuning frequency Δf2 corresponding thereto, a relationship between a difference range defined by a lower limit value D3 and an upper limit value D4, and a tuning frequency Δf3 corresponding thereto, and a relationship between a difference range defined by a lower limit value D4 and an upper limit value D5, and a tuning frequency Δf4 corresponding thereto.

The tuning frequency table Ta sets values of a plurality of tuning frequencies such that the larger a difference Δd between a converted flow rate converted by the flow rate conversion unit 131 and a target flow rate, the larger a flow rate to be tuning by a tuning frequency. Thus, in FIG. 4, a relationship $\Delta f1 < \Delta f2 < \Delta f3 < \Delta f4$ holds.

After having calculated the difference Δd between the converted flow rate converted by the flow rate conversion unit 131 and the target flow rate, the tuning flow rate decision unit 133 refers to the tuning frequency table Ta and decides a tuning frequency in order to change a frequency of the current drive input voltage. Thereafter, the tuning frequency output unit 134 generates a command (voltage signal) for adding or subtracting the tuning frequency transmitted from the tuning frequency decision unit 133 to or from a frequency of the drive input voltage at a time of the decision of the tuning frequency, and outputs the command to the drive circuit 60. When a sign of the difference Δd between the converted flow rate at a time of the decision of the tuning frequency and the target flow rate is minus, a command for adding the tuning frequency is generated and outputted. On the other hand, when a sign of the difference Δd is plus, a command for subtracting the tuning frequency is generated and outputted.

An operation of the tuning frequency output unit 134 is described hereunder, with the tuning frequency decided by the tuning frequency decision unit 133 being referred to as "tuning frequency (Δf)" herebelow for the sake of simplification.

The tuning frequency output unit 134 in this embodiment first performs a former-stage tuning operation for adding or subtracting once or more than once a tuning frequency (Δf) decided by the tuning frequency decision unit 133 to or from a frequency of a drive input at a time of the decision of the tuning frequency (Δf). When there still remains a difference between the flow rate of the liquid and the target flow rate after the former-stage tuning operation, the tuning frequency output unit 134 performs a latter-stage tuning operation.

In the former-stage tuning operation, the tuning frequency output unit 134 first outputs a command for adding or subtracting once the tuning frequency (Δf) to or from the frequency of the drive input voltage at a time of the decision of the tuning frequency (Δf). Thereafter, when a sign of the difference between the flow rate of the liquid and the target flowrate is not reversed to a sign of the difference between the converted flow rate and the target flow rate at a time of the decision of the tuning frequency (Δf) (referred to as difference at a time of decision of tuning frequency), or when there still remains a difference therebetween, the tuning frequency output unit 134 further adds or subtracts once or more than once the tuning frequency (Δf) to or from the drive input voltage to which the tuning frequency (Δf) has been added or from which the tuning frequency (Δf) has been subtracted at the first time, until the sign of the difference between the the flow rate of the liquid and the target flow rate is reversed to the sign of the aforementioned difference at a time of decision of tuning frequency, which is the difference at a time of the decision of the tuning frequency (Δf), or until there is no difference therebetween. In the former-stage tuning operation, the flow rate conversion unit 131 suitably samples a reference voltage value and converts a converted flow rate, while the tuning frequency output unit 134 refers to a converted flow rate as needed.

Here, the tuning frequency (Δf) in this embodiment is set such that, an absolute value of a flow rate change amount of the liquid that is increased or decreased by adding or subtracting the tuning frequency (Δf) to or a frequency of the drive input voltage is smaller than the lower limit value of the difference range corresponding to the tuning frequency (Δf). Thus, in this embodiment, there is basically no possibility that there is no difference between the flow rate of the liquid and a target flow rate by a first addition or subtraction of the tuning frequency (Δf) in the former-stage tuning operation. Such a tuning frequency (Δf) setting is made to suppress reduction in responsiveness to the target flow rate, which may be caused when a flow rate to be tuning varies largely.

In more detail, the upper limit of the difference range defined by the tuning frequency table Ta is set to be smaller than a value twice the lower limit value. The tuning frequency ($\Delta f$) is set such that an absolute value of a flow rate change amount of a liquid that is increased or decreased by adding or subtracting the tuning frequency ($\Delta f$) to or from a frequency of a drive input voltage is larger than a half of the upper limit value of the difference range corresponding to the tuning frequency ($\Delta f$). Namely, in the example shown in FIG. 4, a relationship D2/2<a flow rate change amount by the tuning frequency ($\Delta f$)<D1 holds. This can suppress reduction in responsiveness to the target flow rate, which may be caused when a tuning flow rate excessively becomes small.

When there still remains a difference between the flow rate of the liquid and the target flow rate after the above former-stage tuning operation, the tuning frequency output unit 134 performs the latter-stage tuning operation. In the latter-stage tuning operation, the tuning frequency output unit 134 performs n times a fine tuning unit process that adds or subtracts once or more than once a fine tuning frequency ($\Delta fn$), which is smaller than the tuning frequency ($\Delta f$) used in the former-stage tuning operation, to or from the drive input voltage, until the flow rate of the liquid and the target flowrate match each other. When the fine tuning unit processes are performed more than once (n≥2), a fine tuning frequency ($\Delta fn$) used in the fine tuning unit process is set to be smaller than a fine tuning frequency ($\Delta fn$) used in the immediately before fine tuning unit process. The above "n" is an integer, needless to say.

The latter-stage tuning operation is described in more detail. On the assumption that the former-stage tuning operation is defined as the $0^{th}$ fine tuning unit process. In this case, when a flow rate of the liquid calculated after the $(n-1)^{th}$ fine tuning unit process exceeds a target flow rate (flow rate of liquid>target flow rate), the $n^{th}$ fine tuning unit process in the latter-stage tuning operation subtracts, once or more than once, a fine tuning frequency ($\Delta fn$) from a frequency of a drive input voltage after the $(n-1)^{th}$ fine tuning unit process, until the sign of the difference between the flow rate of the liquid and the target flow rate turns to minus, or until there is no difference between the flow rate of the liquid and the target flow rate. Namely, the tuning frequency output unit 134 is configured to output, to the drive circuit 60, a command (voltage signal) for subtracting the fine tuning frequency ($\Delta fn$) once or more than once, until the sign of the difference between the flow rate of the liquid and the target flow rate turns to minus, or until there is no difference between the flow rate of the liquid and the target flow rate.

On the other hand, when a flow rate of the liquid calculated after the $(n-1)^{th}$ fine tuning unit process falls below a target flow rate (flow rate of liquid<target flow rate), the $n^{th}$ fine tuning unit process in the latter-stage tuning operation adds, once or more than once, a fine tuning frequency ($\Delta fn$) to a frequency of a drive input voltage after the $(n-1)^{th}$ fine tuning unit process, until the sign of the difference between the flow rate of the liquid and the target flow rate turns to plus, or until there is no difference between the flow rate of the liquid and the target flow rate. Namely, the tuning frequency output unit 134 is configured to output a command (voltage signal) for adding the fine tuning frequency ($\Delta fn$) once or more than once, until the sign of the difference between the flow rate of the liquid and the target flow rate turns to plus, or until there is no difference between the flow rate of the liquid and the target flow rate.

When there still remains a difference between the flow rate of the liquid and the target flow rate after the above $n^{th}$ fine tuning unit process, the tuning frequency output unit 134 performs the next fine tuning unit process in the latter-stage tuning operation. Also in the latter-stage tuning operation, the flow rate conversion unit 131 suitably samples a reference voltage value and converts a converted flow rate, while the tuning frequency output unit 134 refers to a converted flow rate as needed. The concept that there is a difference between the flow rate of the liquid and the target flow rate, and the concept that a flow rate of the liquid and the target flow rate match each other include, not only a concept that a flow rate of the liquid and the target flow rate match each other exactly, but also a concept that a flow rate of the liquid and the target flow rate can be regarded to match each other. The reference by which they can be regarded to match each other can be suitably determined by a user, in accordance with a flow rate of a liquid to be used.

In this embodiment, as described above, when the fine tuning unit processes are performed more than once (n≥2), a fine tuning frequency ($\Delta fn$) used in the fine tuning unit process is set to be smaller than a fine tuning frequency ($\Delta fn$) used in the immediately before fine tuning unit process. This allows a flow rate of the liquid to gradually come close to the target flow rate. In more detail, in this embodiment, a fine tuning frequency ($\Delta fn$) used in the $n^{th}$ (n≥1) fine tuning unit process is set to be a value obtained by dividing a tuning frequency ($\Delta f$) used in the former-stage tuning operation by $n^{th}$ power of 2. This allows the fine tuning frequency ($\Delta fn$) to be decided by a simple process.

FIG. 5 shows how a flow rate changes when a flow rate is controlled by the flow rate control device 100. In more detail, FIG. 5 shows a case in which the aforementioned former-stage tuning operation and the subsequent latter-stage tuning operation are performed. The horizontal axis in the graph of FIG. 5 indicates a time (t) and the vertical axis indicates a flow rate (L/min).

In the example shown in FIG. 5, a difference ($\Delta d$) between the converted flow rate converted by the flow rate conversion unit 131 and the target flow rate is included in a difference range in the tuning frequency table Ta shown in FIG. 1, the difference range being defined by the lower limit value D1 and the upper limit value D2. Thus, the tuning frequency decision unit 133 decides a tuning frequency ($\Delta f1$) as a tuning frequency corresponding to the difference ($\Delta d$).

The flow rate of the liquid before the former-stage tuning operation falls below the target flow rate TL (flow rate of liquid<target flow rate TL). Then, the former-stage tuning operation adds the tuning frequency ($\Delta f1$) twice. Due to this process, a sign of the difference between the flow rate of the liquid and the target flow rate TL is reversed to the sign (minus) of the difference ($\Delta d$) at a time of decision of the tuning frequency ($\Delta f1$).

The latter-stage tuning operation is performed because there still remains a difference between the flow rate of the liquid and the target flow rate after the former-stage tuning operation. The latter-stage tuning operation performs a first fine tuning unit process that subtracts a fine tuning frequency ($\Delta fn1$) twice. The fine tuning frequency ($\Delta fn1$) in the first fine tuning unit process is the tuning frequency ($\Delta f1$)/2. A second fine tuning unit process is performed because there still remains a difference between the flow rate of the liquid and the target flow rate TL after the first fine tuning unit process. The second fine tuning unit process adds a fine tuning frequency (Δfn2) twice. The fine tuning frequency (Δfn2) in the second fine tuning unit process is the tuning frequency (Δf1)/$2^2$. A third fine tuning unit process is performed because there still remains a difference between the flow rate of the liquid and the target flow rate TL after the second fine tuning unit process. The third fine tuning unit process subtracts a fine tuning frequency (Δfn3) twice. The fine tuning frequency (Δfn3) in the third fine tuning unit process is the tuning frequency (Δfn1)/$2^3$. In this manner, the flow rate of the liquid gradually comes close to the target flow rate TL.

Figure 6:
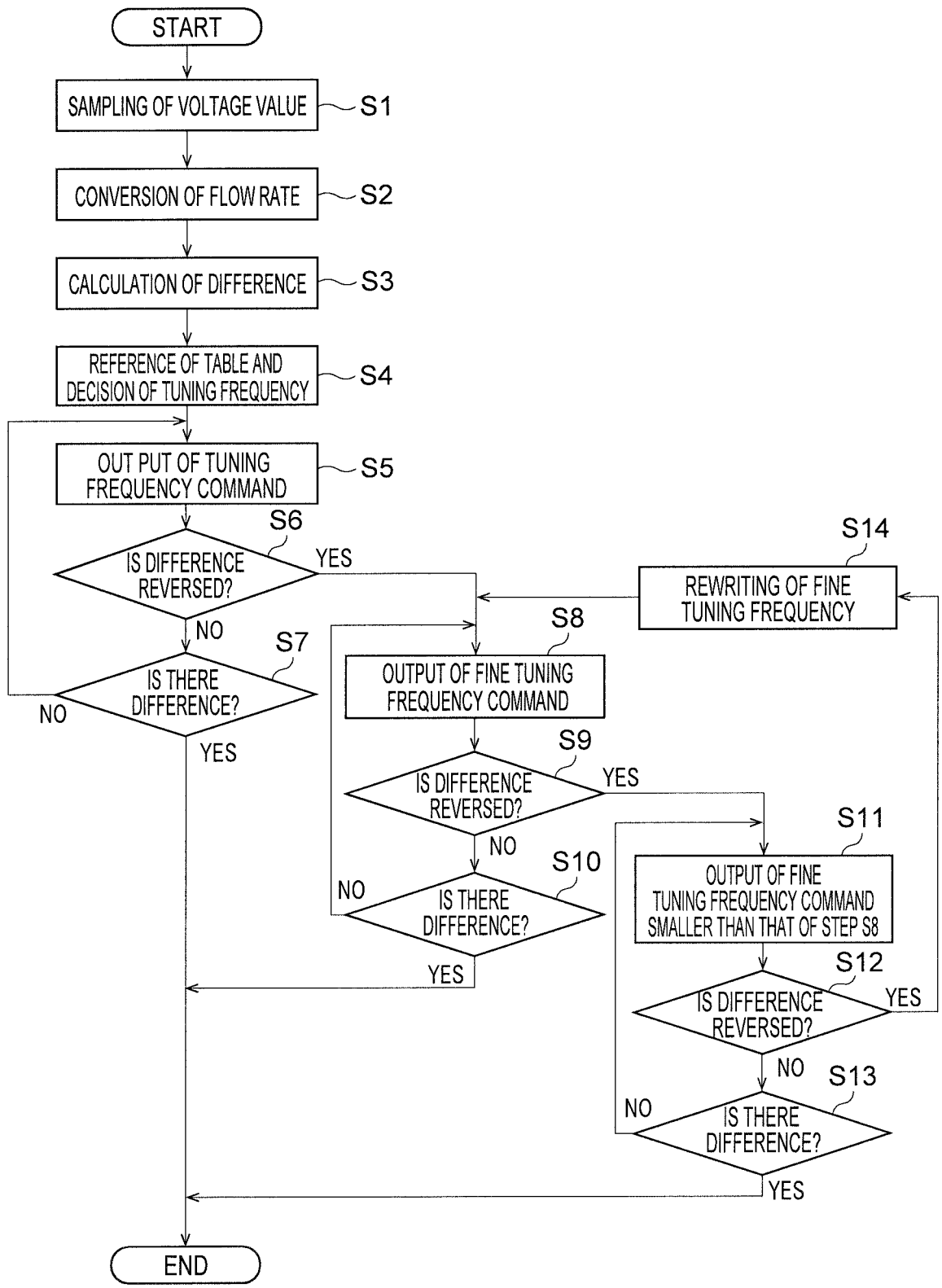
FIG. 6 is a view showing a flowchart illustrating an example of a flow rate control operation by the flow rate control device according to the embodiment of the present invention.

FIG. 6 is a flowchart illustrating an example of a flow rate control operation by the flow rate control device 100. The example of the flow rate control operation by the flow rate control device 100 is described hereunder with reference to FIG. 6.

The process of FIG. 6 is initiated by occurrence of a flow control start event, for example. The flow control start event may occur periodically, or it may occur when a difference between the flow rate of the liquid and the target flow rate becomes a certain value or more.

In this example, in a step S1, the flow rate conversion unit 131 samples a voltage value (a reference voltage value in this embodiment) generated by the FV converter 120. Then, in a step S2, the flow rate conversion unit 131 coverts a converted flow rate from the reference voltage value.

Then, in a step S3, the tuning frequency decision unit 133 calculates a difference between the converted flow rate converted by the flow rate conversion unit 131 and the target flow rate. Then, in a step S4, the tuning frequency decision unit 133 decides, based on the calculated difference and the tuning frequency table Ta stored by the table holding unit 132, a tuning frequency corresponding to the calculated difference, from among the plurality of tuning frequencies recorded in the tuning frequency table Ta.

Then, in a step S5, the tuning frequency output unit 134 outputs, to the drive circuit 60, a command (tuning frequency command) for adding or subtracting once the tuning frequency decided by the tuning frequency decision unit 133 to or from a frequency of a drive input voltage at a time of the decision of the tuning frequency. Thus, the frequency of the drive input voltage to be inputted to the motor 12 by the drive circuit 60 is changed, so that the flow rate of the liquid to be discharged by the pump 10 is changed.

Then, in a step S6, the tuning frequency output unit 134 determines whether a sign of a difference between the flow rate of the liquid and the target flow rate after the first addition or subtraction of the tuning frequency is reversed to the sign of the difference at a time of the decision of the tuning frequency in the step S4 (difference at a time of decision of frequency). When it is determined that the sign of the difference is not reversed in the step S6, the tuning frequency output unit 134 determines whether there is a difference between the current flow rate and the target flow rate in a step S7. When it is determined that there is a difference in the step S7, the tuning frequency output unit 134 returns to the step S5, and outputs, to the drive circuit 60, a command for further adding or subtracting the tuning frequency once. When it is determined that there is no difference in the step S7, i.e., when the flow rate of the liquid matches the target flow rate, the flow rate control operation is terminated.

The process for adding or subtracting the tuning frequency in the step S5 is repeated until it is determined that the sign of the difference is reversed in the step S6, or until it is determined that there is no difference in the step S7.

Namely, the processes from the step S5 to the step S7 correspond to the aforementioned former-stage tuning operation.

On the other hand, in the step S6, when it is determined that the sign of the difference between the flow rate of the liquid and the target flow rate is reversed to the sign of the difference at a time of decision of the tuning frequency in the step S4, the process proceeds to a step S8. In the step S8, the tuning frequency output unit 134 outputs, to the drive circuit 60, a command (tuning frequency command) for adding or subtracting once a fine tuning frequency to or from a frequency of a drive input voltage after the former-stage tuning operation. Namely, a first fine tuning unit process in the latter-stage tuning operation is performed. As described above, the fine tuning frequency in the first fine tuning unit process is set to be a value obtained by dividing the tuning frequency used in the former-stage tuning operation by a power of 2.

Then, in a step S9, the tuning frequency output unit 134 determines whether the sign of the difference between the current flow rate of the liquid and the target flow rate is reversed to the sign of the difference between the flow rate of the liquid and the target flow rate at a time of the reverse of the sign of the difference in the step S6. When it is determined that the sign of the difference is not reversed in the step S9, the tuning frequency output unit 134 determines whether there is a difference between the current flow rate and the target flow rate in a step S10. When it is determined that there is a difference in the step S10, the tuning frequency output unit 134 returns to the step S8, and outputs, to the drive circuit 60 a command for further adding or subtracting once a fine tuning frequency. When it is determined that there is no difference in the step S10, i.e., when the flow rate of the liquid matches the target flow rate, the flow rate control operation is terminated.

The process for adding or subtracting a fine tuning frequency in the step S8 is repeated until it is determined that the sign of the difference is reversed in the step S9, or until it is determined that there is no difference in the step S10.

In the step S9, when it is determined that the sign of the difference between the flow rate of the liquid and the target flow rate is reversed to the sign of the difference between the flow rate of the liquid and the target flow rate at a time of the reverse of the sign of the difference in the step S6, the process proceeds to a step S11, and a second fine tuning unit process in the latter-stage tuning operation is performed.

In the step A11, the tuning frequency output unit 134 outputs, to the drive circuit 60, a command (tuning frequency command) for adding or subtracting once a fine tuning frequency to or from a frequency of a drive input voltage. As described above, the fine tuning frequency in the second fine tuning unit process is set to be a value obtained by dividing the tuning frequency used in the former-stage tuning operation by 2 squared.

Then, in a step S12, the tuning frequency output unit 134 determines whether the sign of the difference between the current flow rate of the liquid and the target flow rate is reversed to the sign of the difference between the flow rate of the liquid and the target flow rate at a time of the reverse of the sign of the difference in the step S9. When it is determined that the sing of the difference is not reversed in the step S12, the tuning frequency output unit 134 determines whether there is a difference between the current flow rate and the target flow rate in a step S13. When it is determined that there is a difference in the step S13, the tuning frequency output unit 134 returns to the step S11, and outputs, to the drive circuit 60 a command for further adding or subtracting once a fine tuning frequency. When it is determined that there is no difference in step S13, i.e., when the flow rate of the liquid matches the target flow rate, the flow rate control operation is terminated.

The process for adding or subtracting a fine tuning frequency in the step S11 is repeated until it is determined that the sign of the difference is reversed in the step S12, or until it is determined that there is no difference in the step S13. When it is determined that the sign of the difference is reversed in the step S12, in a step S14, the fine tuning frequency is rewritten to half of the fine tuning frequency used in the step S11, and the process returns to the step S8. The step S8 outputs, to the drive circuit 60, a command (tuning frequency command) for adding or subtracting once the fine tuning frequency written in the step S14 to or from a frequency of a drive input voltage. The processes from the step S8 to the step S14 correspond to the latter-stage tuning operation.

The aforementioned operation flow shown in FIG. 6 is an example, and the present invention is not limited to the operation shown in FIG. 6.

The flow rate control device 100 according to the aforementioned embodiment comprises the flowmeter 110, the FV converter 120, and the controller 130. The flowmeter 110 repeatedly generates a pulse signal based on a flow of the liquid discharged by the drive of the motor 12 from the pump 10 as a fluid machine, such that a pulse width of the generated pulse signal is inversely proportional to a flow rate of the liquid. The FV converter 120 makes frequency-voltage conversion of the pulse signal generated by the flowmeter 110, and generates a voltage value corresponding to the pulse signal. The controller 130 changes a frequency of a drive input voltage for driving the motor 12 based on a difference between a liquid converted flow rate converted based on the voltage value generated by the FV converter 120 and a preset target flow rate.

Namely, along with a flow rate control procedure, this embodiment performs a pulse signal acquisition step, an FV conversion step, and a control step that changes a frequency of a drive input voltage. The pulse signal acquisition step acquires a pulse signal from the flowmeter 110. The FV conversion step makes frequency-voltage conversion of the pulse signal acquired in the pulse signal acquisition step, and generates a voltage value corresponding to the pulse signal. The control step changes a frequency of the drive input voltage of the motor 12 based on a difference between a liquid converted flow rate converted based on the voltage value generated by the FV converter 120 and a preset target flow rate.

Since the FV converter 120 makes frequency-voltage conversion of a pulse signal generated by the flowmeter 110, this embodiment can convert pulse signals repeatedly generated based on a liquid flow into a continuous physical quantity of voltage values (analog signals). Thus, for example, the controller 130 can determine a voltage value showing a flow rate by one sampling carried out at a given timing, and can decide a flow rate of a liquid to be discharged from the pump 10. This enables to suppress detection leakage of the controller 130 with a reduced load of a signal process, and to appropriately perform flow rate control based on the flow rate detection. Thus, the flow rate control can be suitably performed by simple hardware resources and software processes.

The embodiment of the present invention has been described above, but the present invention is not limited to the aforementioned embodiment and the present invention can be variously modified. For example, the flow rate control device 100 according to the aforementioned embodiment is applied to flow rate control of a liquid discharged by the pump 10, the flow rate control device 100 may be applied to flow rate control of a gas discharged by a blower.

What is claimed is:

1. A flow rate control device comprising:
   flowmeter that repeatedly generates a pulse signal based on flow of a fluid discharged from a fluid machine driven by a brushless motor or AC motor, such that a pulse width of the pulse signal is inversely proportional to a flow rate of the fluid;
   a FV (frequency-to voltage) converter that makes frequency-voltage conversion of the pulse signal and generates a voltage value corresponding to the pulse signal; and
   a controller that changes a frequency of a drive input voltage for driving the brushless motor or AC motor based on a difference between a converted flow rate of the fluid converted based on the voltage value generated by the FV converter and a preset target flow rate,
   wherein the controller stores a tuning frequency table that records relationships between a plurality of difference ranges each of which defines a range to which an absolute value of a difference between the converted flow rate and the target flow rate belongs by a lower limit value and an upper limit value of the range, and a plurality of tuning frequencies defined correspondingly to the respective difference ranges, and
   wherein the controller decides, based on a difference between the converted flow rate and the target flow rate and the tuning frequency table, the tuning frequency corresponding to the difference between the converted flow rate and the target flowrate, from among the plurality of tuning frequencies, and changes a frequency of the drive input voltage by outputting a command for adding or subtracting the decided tuning frequency to or from a frequency of the drive input voltage at a time of the decision of the tuning frequency.

2. The flow rate control device according to claim 1, wherein
   the FV converter is configured to generate the one voltage value for the one pulse signal, and to calculate a reference voltage value by a moving average of a plurality of the voltage values, and
   the controller converts the converted flow rate from the reference voltage value.

3. The flow rate control device according to claim 2, wherein
   the FV converter calculates the reference voltage value by a moving average of the voltage values the number of which is between 40 or more and 80 or less.

4. The flow rate control device according to claim 3, wherein the FV converter makes frequency-voltage conversion of the pulse signals generated by the flowmeter at a rate of between 10 or more and 120 or less per second.

5. The flow rate control device according to claim 1, wherein
   the controller first performs a former-stage tuning operation that adds or subtracts once the tuning frequency ($\Delta f$), thereafter when a sign of a difference between a flow rate of the fluid and the target flow rate is not reversed to a sign of a difference at a time of decision of frequency, which is a difference between the converted flow rate and the target flow rate at a time of the decision of the tuning frequency ($\Delta f$), or when there still remains a difference, the former-stage tuning operation further adds or subtracts, once or more than once, the tuning frequency (Δf) until the sign of the difference between a flow rate of the fluid and the target flow rate is reversed to the sign of the difference at a time of decision of frequency, which is the difference at a time of the decision of the tuning frequency (A), or until there is no difference, when there still remains a difference between a flow rate of the fluid and the target flow rate after the former-stage tuning operation, the controller performs a latter-stage tuning operation by performing n times a fine tuning unit process that adds or subtracts once or more than once a fine tuning frequency (Δfn), which is smaller than the tuning frequency (Δf) used in the former-stage tuning operation, to or from the drive input voltage, until a flow rate of the fluid and the target flow rate match each other, and when the fine tuning unit processes are performed more than once (n≥2), the controller sets the fine tuning frequency (Δfn) used in the fine tuning unit process such that the fine tuning frequency (Δfn) is smaller than the fine tuning frequency (Δfn) used in the immediately before fine tuning unit process.

6. The flow rate control device according to claim 5, wherein on the assumption that the former-stage tuning process is defined as the 0th fine tuning unit process, when a flow rate of the fluid calculated after the (n−1)th fine tuning unit process exceeds the target flow rate, the nth fine tuning unit process in the latter-stage tuning operation subtracts, once or more than once, the fine tuning frequency (Δfn) from a frequency of the drive input voltage after the (n−1)th fine tuning unit process, until the sign of the difference between a flow rate of the fluid and the target flow rate turns to minus, or until there is no difference between a flow rate of the fluid and the target flow rate, when a flow rate of the fluid calculated after the (n−1)th fine tuning unit process falls below the target flow rate, the nth fine tuning unit process in the latter-stage tuning operation adds, once or more than once, the fine tuning frequency (Δfn) to a frequency of the drive input voltage after the (n−1)th fine tuning unit process, until the sign of the difference between a flow rate of the fluid and the target flow rate turns to plus, or until there is no difference between a flow rate of the fluid and the target flow rate, and when there still remains a difference between a flow rate of the fluid and the target flow rate after the nth fine tuning unit process, the controller performs the next fine tuning unit process in the latter-stage tuning operation.

7. The flow rate control device according to claim 5, wherein the fine tuning frequency (Δfn) used in the nth fine tuning unit process is set to be a value obtained by dividing the tuning frequency (Δf) used in the former-stage tuning operation by nth power of 2.

8. The flow rate control device according to claim 1, wherein the tuning frequency (Δf) is set such that an absolute value of a flow rate change amount of the fluid that is increased or decreased by adding or subtracting the tuning frequency (Δf) to or from a frequency of the drive input voltage is smaller than the lower limit value of the difference range corresponding to the tuning frequency (Δf).

9. The flow rate control device according to claim 8, wherein the upper limit value is set to be smaller than a value twice the lower limit value, and the tuning frequency (Δf) is set such that an absolute value of a flow rate change amount of the fluid that is increased or decreased by adding or subtracting the tuning frequency (Δf) to or from a frequency of the drive input voltage is larger than a half of the upper limit value of the difference range corresponding to the tuning frequency (Δf).

10. The flow rate control device according to claim 1, wherein the controller performs, by a single-core CPU, a process for acquiring the voltage value, a process for converting a flow rate of the fluid based on the voltage value, a process for calculating a difference between the converted flow rate and the target flow rate, and a process for changing a frequency of the drive input voltage.

11. A flow rate control method comprising:

a pulse signal acquisition step that acquires a pulse signal from a flowmeter that repeatedly generates the pulse signal based on flow of a fluid discharged from a fluid machine driven by a brushless motor or AC motor, such that a pulse width of the pulse signal is inversely proportional to a flow rate of the fluid, the pulse signal;

a FV (frequency-to voltage) conversion step that makes frequency-voltage conversion of the pulse signal and generates a voltage value corresponding to the pulse signal; and a control step that changes a frequency of a drive input voltage for driving the brushless motor or AC motor based on a difference between a converted flow rate of the fluid converted based on the voltage value generated by the FV conversion step and a preset target flow rate, wherein, in the control step, based on a difference between the converted flow rate and the target flow rate and a tuning frequency table, a tuning frequency corresponding to the difference between the converted flow rate and the target flow rate is decided from among a plurality of tuning frequencies, and a frequency of the drive input voltage is changed by outputting a command for adding or subtracting the decided tuning frequency to or from a frequency of the drive input voltage at a time of the decision of the tuning frequency, and wherein the tuning frequency table records relationships between a plurality of difference ranges each of which defines a range to which an absolute value of a difference between the converted flow rate and the target flow rate belongs by a lower limit value and an upper limit value of the range, and the plurality of tuning frequencies defined correspondingly to the respective difference ranges.

12. A chiller comprising a flow rate control device according to claim 1, and a liquid circulator that circulates a cooled liquid, wherein a flow rate of the liquid is controlled by the flow rate control device.

* * * * *